(12) United States Patent
Guerin et al.

(10) Patent No.: US 10,657,802 B2
(45) Date of Patent: May 19, 2020

(54) METHOD, DEVICE, AND COMPUTER-READABLE MEDIUM FOR MOBILE DEVICE MANAGEMENT OF COLLABORATIVE INDUSTRIAL ROBOT

(71) Applicant: THE JOHNS HOPKINS UNIVERSITY, Baltimore, MD (US)

(72) Inventors: Kelleher Guerin, Baltimore, MD (US); Gregory Hager, Baltimore, MD (US)

(73) Assignee: THE JOHNS HOPKINS UNIVERSITY, Baltimore, MD (US)

(*) Notice: Subject to any disclaimer, the term of this patent is extended or adjusted under 35 U.S.C. 154(b) by 52 days.

(21) Appl. No.: 15/341,136

(22) Filed: Nov. 2, 2016

(65) Prior Publication Data

US 2017/0120440 A1    May 4, 2017

Related U.S. Application Data

(60) Provisional application No. 62/249,686, filed on Nov. 2, 2015.

(51) Int. Cl.
*G08C 17/02* (2006.01)
*G05B 19/409* (2006.01)

(52) U.S. Cl.
CPC ........... *G08C 17/02* (2013.01); *G05B 19/409* (2013.01); *G05B 2219/39384* (2013.01); *G05B 2219/40382* (2013.01); *G08C 2201/20* (2013.01); *G08C 2201/30* (2013.01); *G08C 2201/70* (2013.01); *G08C 2201/91* (2013.01)

(58) Field of Classification Search
CPC ........... B25J 9/161; G05B 2219/23161; G05B 2219/36159; G05B 2219/39384; G05B 2219/33192; G05B 19/409; G05B 2219/40382; G08C 17/02; G08C 2201/20; G08C 2201/30; G08C 2201/70; G08C 2201/91
See application file for complete search history.

(56) References Cited

U.S. PATENT DOCUMENTS

| | | | |
|---|---|---|---|
| 6,167,464 A | 12/2000 | Kretschmann | |
| 8,364,313 B2 * | 1/2013 | Akashi | B25J 9/1676 318/568.11 |
| 2001/0035729 A1 * | 11/2001 | Graiger | G08C 17/02 318/587 |

(Continued)

FOREIGN PATENT DOCUMENTS

| | | |
|---|---|---|
| WO | 2005114368 A1 | 12/2005 |
| WO | 2007/072314 A1 | 6/2007 |

OTHER PUBLICATIONS

International Search Report and Written Opinion for PCT/US2016/059989 dated Feb. 28, 2017.

(Continued)

*Primary Examiner* — Dale Moyer
(74) *Attorney, Agent, or Firm* — MH2 Technology Law Group, LLP (57) ABSTRACT

Provided is a method, device, and computer-readable medium for controlling a robot graphic user interface ("RGUI") on a mobile device. The method can include determining a distance, a position, or both of the mobile device with respect to a first robot; and causing, by a processor, a first RGUI to be displayed on a display of the mobile device based on the determining.

15 Claims, 7 Drawing Sheets

(56) References Cited

U.S. PATENT DOCUMENTS

| | | | |
|---|---|---|---|
| 2006/0232236 A1* | 10/2006 | Calcagno | G05B 19/42 318/568.11 |
| 2007/0297890 A1* | 12/2007 | Sjoberg | B25J 13/065 414/735 |
| 2008/0255704 A1 | 10/2008 | Braut et al. | |
| 2009/0002981 A1* | 1/2009 | Knibbe | G01S 5/14 362/233 |
| 2009/0204261 A1* | 8/2009 | Strand | B25J 9/1656 700/264 |
| 2010/0262288 A1 | 10/2010 | Svensson et al. | |
| 2014/0033108 A1* | 1/2014 | Paccagnan | G05B 19/409 715/771 |
| 2015/0066209 A1 | 3/2015 | Som | |
| 2015/0177718 A1* | 6/2015 | Vartiainen | G05B 19/0423 700/83 |
| 2016/0127858 A1* | 5/2016 | Brockhaus | H04Q 9/00 455/41.1 |
| 2016/0291841 A1* | 10/2016 | Mudireddy | G06F 3/0227 |
| 2017/0100838 A1* | 4/2017 | Lewis | B25J 9/1676 |

OTHER PUBLICATIONS

European Search Report dated Mar. 21, 2019 in EP Application No. 16862821.2, 7 pages.
European Office Action in European Application No. 16862821.2 dated Mar. 20, 2020, 5 pages.

* cited by examiner

METHOD, DEVICE, AND COMPUTER-READABLE MEDIUM FOR MOBILE DEVICE MANAGEMENT OF COLLABORATIVE INDUSTRIAL ROBOT

CROSS REFERENCE TO RELATED APPLICATIONS

This application claims priority to U.S. Provisional Patent Application 62/249,686 filed on Nov. 2, 2015, which is hereby incorporated by reference in its entirety.

GOVERNMENT SUPPORT STATEMENT

This invention was made with Government support under Grant No. NRI-1227277 awarded by the National Science Foundation. The U.S. Government has certain rights in this invention.

FIELD

The present disclosure relates generally to systems and methods for enabling human-machine collaborations via a generalized framework that supports dynamic adaptation and reuse of robotic capability representations and human-machine collaborative behaviors.

BACKGROUND

Robotic industrial automation has seen significant success in large-scale manufacturing because it offers significant advantages at scale for tasks such as welding, cutting, stamping, painting, heavy material handling, precision material machining, etc. The success of robotic automation in large-scale manufacturing has led to a long-standing desire to extend the use of robotic automation into small and medium-sized manufacturing enterprises ("SMEs"). However, in contrast to large scale manufacturing, SMEs' production processes are typically characterized by small production volumes and/or high product variability. Consequently, the ability to amortize the infrastructure, specialized personnel, setup, and programming of flexible robotic automation is far reduced for SMEs.

SME processes sometimes include tasks that require a high level of customization and therefore necessarily involve human skill and judgment. For example, refurbishment tasks and build-to-order manufacturing processes must accommodate unforeseen workpiece variances and equipment modifications. In such cases, an existing human-centered production process may find it difficult to determine where or how robotic automation can be a useful addition to an effective human-intensive process, rather than a duplication or attenuation thereof. Take, for instance, an SME specializing in custom furniture manufacturing that has a number of highly-skilled employees. That SME may want to improve the efficiency and productivity of its employees by using robotic systems to automate repetitive tasks that involve dexterous actions, such as drilling or sanding tasks. However, a commercial off-the-shelf robotic system would not be useful in this case because it would be impossible for the SME to leverage its employees' existing task knowledge and experience.

The teach pendant is a mainstay of industrial robots. Usually a control panel or touch screen attached by tether to the robot, the teach pendant is used for controlling all aspects of the robot, from writing code to programming actions. However, because the teach pendant is connected to the robot using wires, the programmer needs to be in close proximity of the robot in order to use the teach pendant. This close proximity may not be wanted or even desired due to safety considerations. Also, having a different teach pendant for each robot may make robot control and management a difficult and time consuming process.

There is therefore a need for systems and methods for overcoming these and other problems presented by the prior art.

SUMMARY

In accordance with examples of the present disclosure, a method of controlling a robot graphic user interface ("RGUI") on a mobile device is provided. The method comprises determining a distance, a position, or both of the mobile device with respect to a first robot; and causing, by a processor, a first RGUI to be displayed on a display of the mobile device based on the determining.

In some examples, the method further comprises determining a distance, a position, or both of the mobile device with respect to a second robot; and causing, by a processor, a second RGUI to be displayed on the display of the mobile device based on the determining.

In some examples, the distance, the position, or both is determined based on one or more wireless protocols. In some examples, the one or more wireless protocols comprise one or more of: WiFi, Bluetooth, RFID, cellular, ANT+, IrDA, ZigBee, Z-Wave, NFC.

In some examples, the determining comprises assigning a RGUI for the mobile device based on a waypoint on a user, the robot, or both; and selecting the RGUI based on the waypoint.

In some examples, the first RGUI changes as the distance, the position, or both of the mobile device changes.

In accordance with examples of the present disclosure, a device of controlling a robot graphic user interface ("RGUI") is provided. The device comprises a memory containing instructions; and at least one processor, operably connected to the memory, that executes the instructions to perform operations comprising: determining a distance, a position, or both of the device with respect to a first robot; and causing, by a processor, a first RGUI to be displayed on a display of the device based on the determining.

In some examples, the at least one processor is further operable to perform the method comprising: determining a distance, a position, or both of the device with respect to a second robot; and causing, by a processor, a second RGUI to be displayed on the display of the device based on the determining; and causing by a processor, a state change on the robot based on the determining. In some examples, the distance, the position, or both is determined based on one or more wireless protocols. In some examples, the one or more wireless protocols comprise one or more of: WiFi, Bluetooth, RFID, cellular, ANT+, IrDA, ZigBee, Z-Wave, NFC. In some examples, the determining comprises: assigning a RGUI for the device based on a docking location on a user, the robot, or both; and selecting the RGUI based on the docking location; and causing a state change on the robot based on the docking location. In some examples, the first RGUI changes as the distance, the position, or both of the device changes.

In accordance with examples of the present disclosure, a computer-readable medium computer-interpretable instructions which, when executed by at least one electronic processor, cause the at least one electronic processor to perform a method of controlling a robot graphic user interface ("RGUI") on a mobile device is provided. The method comprises determining a distance, a position, or both of the mobile device with respect to a first robot; and causing, by a processor, a first RGUI to be displayed on a display of the mobile device based on the determining. In some examples, the computer-readable medium further comprising determining a distance, a position, or both of the mobile device with respect to a second robot; and causing, by a processor, a second RGUI to be displayed on the display of the mobile device based on the determining; and causing, by a processor, a state change to occur on the robot. In some examples, the distance, the position, or both is determined based on one or more wireless protocols. In some examples, the one or more wireless protocols comprise one or more of: WiFi, Bluetooth, RFID, cellular, ANT+, IrDA, ZigBee, Z-Wave, NFC. In some examples, the determining comprises: assigning a RGUI for the mobile device based on a docking location on a user, the robot, or both; and selecting the RGUI based on the docking location; and triggering a state change on the robot. In some examples, the first RGUI changes as the distance, the position, or both of the mobile device changes.

BRIEF DESCRIPTION OF THE DRAWINGS

The drawings are not necessarily to scale. Instead, emphasis is generally placed upon illustrating the principles of the disclosures described herein. The accompanying drawings, which are incorporated in and constitute a part of this specification, illustrate several embodiments consistent with the disclosures and together with the description, serve to explain the principles of the disclosures. In the drawings.

DETAILED DESCRIPTION

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the disclosure. Accordingly, the following detailed description does not limit the disclosure. Instead, the proper scope of the disclosure is defined by the appended claims.

In the present disclosure, the word "robot" will be used instead of robotic manipulator or set of robotic manipulators. Typically, a robot is an industrial robotic manipulator or a set of industrial robotic manipulators for automated or semi-automated production applications. A robot's envelope space is the range of motion over which the robot can physically move or reach, which includes a set of points in space that can be reached by the robot's end-effector, which can be a tool effector attached to the robot or a tool grasped or held by a gripper-type end-effector attached to the robot. For example, the robot's envelope space can include the range of motion over which a tool effector point ("TEP") of the robot can physically move or reach. The robot's TEP can be defined as a reference point in a point cloud of the tool effector attached to the robot (e.g., a user-selected point, the tool effector's endpoint, its point of attachment to the robot, etc.) or the tool grasped by the robot's end-effector (e.g., a user-selected point, the tool's endpoint, the point at which the end-effector grasps the tool, etc.). The size and shape of the robot's envelope space depend on the coordinate geometry of the robot and are influenced by the robot's design, such as the robot's configuration (e.g., types of joints, the joints' range of movement, lengths of links connecting the joints, etc.), number of degrees of freedom ("DOF"), and the like. In some embodiments, the size and shape of the robot's envelope space can also be influenced by the size and shape of the tool effector attached to the robot or the tool grasped by the robot's end-effector. The robot can perform work within its maximum workspace, which generally contains all or almost all of the points in the robot's envelope space. The collaborative system can constrain the robot's workspace to a subset of the points in the robot's maximum workspace to enforce or apply one or more constraints, which is described in greater detail below.

In accordance with the various aspects of the present disclosure, a system and method are provided whereby a mobile device (phone, tablet, wireless device) can be used in lieu of this teach pendant. This allows for greater mobility of the robot programmer at the site, allows for easy access to commonly used robot commands, and also allows for changes in human-robot interactive behavior based on distance between the user and robot. This also conforms better to the increasingly prevalent method of physically interacting with human safe robots, where the user is physically guiding the robot. A mobile device allows the user to have robot controls at-the-ready while guiding the robot.

In general the present disclosure can have the following features. A robot graphical user interface (RGUI), which is present on a mobile device with a touch screen. The RGUI can accept touch, voice, gestural, acceleration-based or stylus-based input, and can display visual, vibration and auditory output. The mobile device could also allow for display via an immersive virtual or augmented reality display. The mobile device can be held in hand during robot interaction, can be attached to the body of the user via an armband or sleeve, or can be docked to various positions on the robot. Based on the position of the device, the RGUI can change modes.

The mobile device itself can recognize its position on the robot or user, based on RFID tags placed at certain "docking locations" on the robot or user. Such locations include the end effector of the robot, the base of the robot, an armband on the user, in the user's pocket, or in a custom cradle for holding the wireless device, that is not located on or nearby a robot. The mobile device can also recognize its position, or a change in location, based on camera sensing, inertial sensing or through specific interaction via the user (for instance, the user presses a button titled "DOCK TO ROBOT". Additionally, physical changes in the location or docking position of the mobile device can trigger changes of mode on the robot.

Based on the distance from one or more robots, the RGUI can change modes. For instance, assuming there are two robots in the facility, when the user is more than 5 meters away from both robots, the RGUI shows an overview of what the two robots are currently working on. When the user approaches one robot, closer than 5 meters, but further that 1 meter, the RGUI shows a more detailed overview for that particular robot, but high priority messages about the other robot can be reported. When the user gets close to the robot to interact with it, the RGUI could show a detailed interface for a specific action, such as adding waypoints to the robot's program, as described further below with reference to FIG. 1. A multitude of possible displays can be shown by the RGUI for different distances, different docking positions, and/or number of robots. These can be selected as options by the user to be triggered by the distance events.

The distance-based changes in the RGUI can also adapt to different modes the robot is in. If the robot is moving and executing a task, approaching the robot might trigger a warning on the RGUI, or information about the specific action. Approaching the robot in teaching mode might trigger the RGUI to offer an interface for teaching the robot.

Based on the number of active or nearby robots, the RGUI can change modes. Similarly, if several robots are operating simultaneously, updates on their progress and current state that are displayed in the RGUI can be prioritized based on which robot is closest to the user.

The system operates as follows. One or more robotic system is equipped with a communication layer. This layer allows for wireless devices, or a central server to communicate with the robot. A robotic graphical user interface (RGUI) runs on the mobile device. This user interface can change display and input modalities depending on which interaction modality is being used. The RGUI can detect acceleration events, touch screen presses, and voice input. These actions can trigger robot events, programming calls, processes or other events on the robotic system. A communication manager (CM) also runs on the mobile device. The CM communicates wirelessly with either the robots (via wifi or bluetooth, or other protocol) or a central server (via wifi or bluetooth, or other protocol). The CM also incorporates an RFID process that uses the wireless devices' onboard RFID reader.

The following distance metric can be used to switch between RGUI interaction modalities: when the CM recognizes one or more robot within short range RFID; when the CM recognizes a robot is within short range RFID, and one or more other robot is within long range RFID; when the CM recognizes one or more robot within long range RFID; when the CM recognizes that no robots are within long range RFID, but robots are still found on the network communication layer; when the CM recognizes via short range RFID that the wireless device has been placed on a specific part of the robot; when the CM recognizes via short range RFID that the wireless device has been placed in a docking position on the user (for instance, on a cradle attached to a glove or arm band).

The following mounting options can be selected by the user to trigger a change in RGUI interaction modalities: the mobile device is placed on a forearm position of a user; the mobile device is docked to the base of the robot; the mobile device is docked to the end-effector region of the robot; the mobile device is placed in the pocket of the user.

Communication that takes place between the wireless device and the robot can contain but is not limited to the following information: robot task state; robot internal state; warning/error messages; feedback on programming progress; task progress.

In some aspects, the robot can trigger changes to the RGUI based on its state, even though the device may have not changed location.

Figure 1:
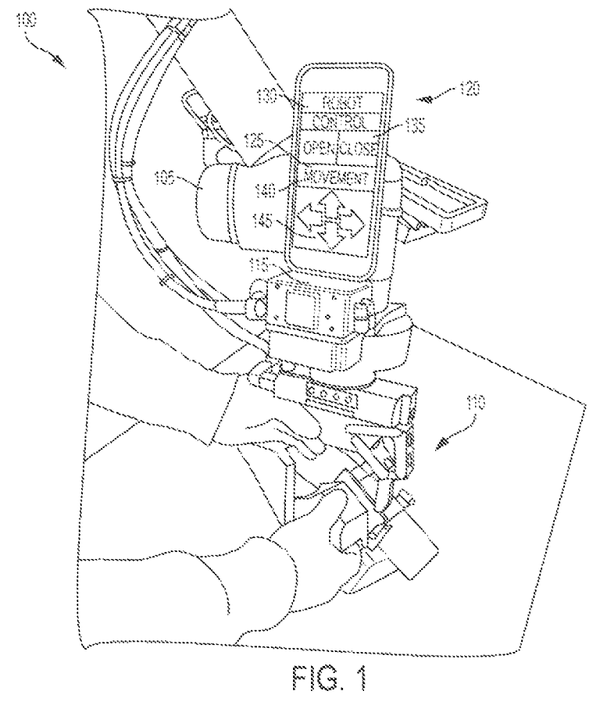
FIG. 1 shows an example scenario where a mobile device is docked with a robot, where the RGUI provides for an interface that allows for interaction of movement control of the robot, according to embodiments.

FIG. 1 shows an example scenario 100 where a mobile device is docked with a robot, where the RGUI provides for an interface that allows for interaction of movement control of the robot, according to embodiments. As shown in FIG. 1, robot 105 has an end effector 110 in the form of a grasping member and mobile device dock 115 for providing an electrical connection with mobile device 120. Mobile device 120 includes a RGUI 125 that allows for interaction with robot 105. In the robot docketed state of FIG. 1, RGUI 125 provides for movement monitoring and control of end effector 110. RGUI 125 can include robot identity descriptor portion 130, end effector control portion 135, for example "open" or "close," end effector action description portion 140, an end effector movement indictor portion 145 that shows movement indicators for up, down, left, and right.

Figure 2:
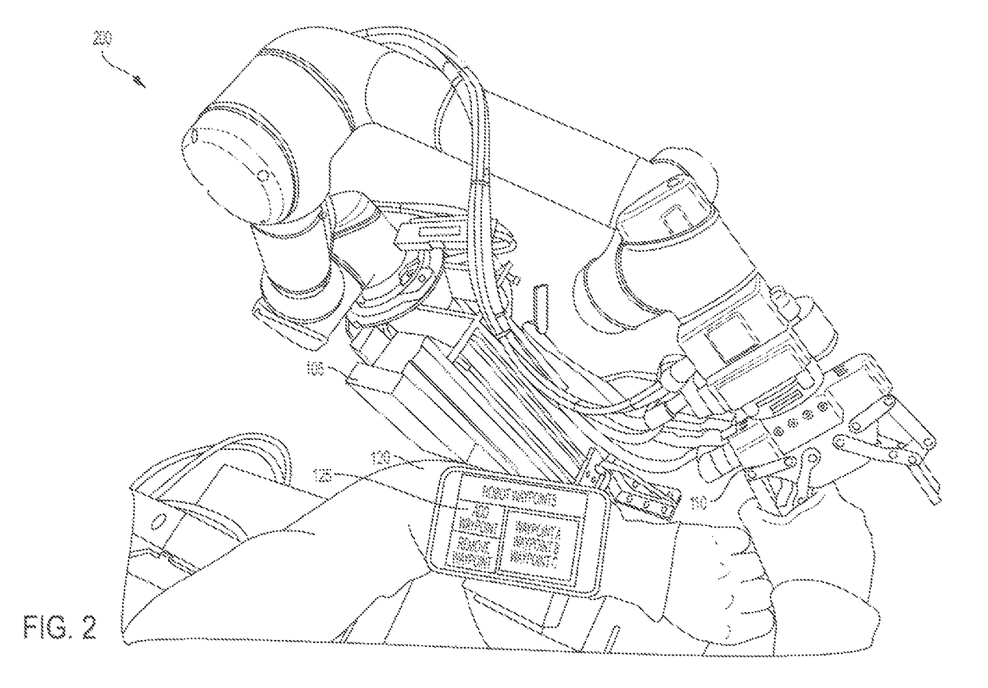
FIG. 2 shows an example scenario where mobile device is mounted on a user's forearm, where RGUI provides for an interface that allows for setting of one or more waypoints for robot, according to embodiments.

FIG. 2 shows an example scenario 200 where mobile device 120 is mounted on a user's forearm, where RGUI 125 provides for an interface that allows for setting of one or more waypoints for robot 105, according to embodiments.

Figure 3:
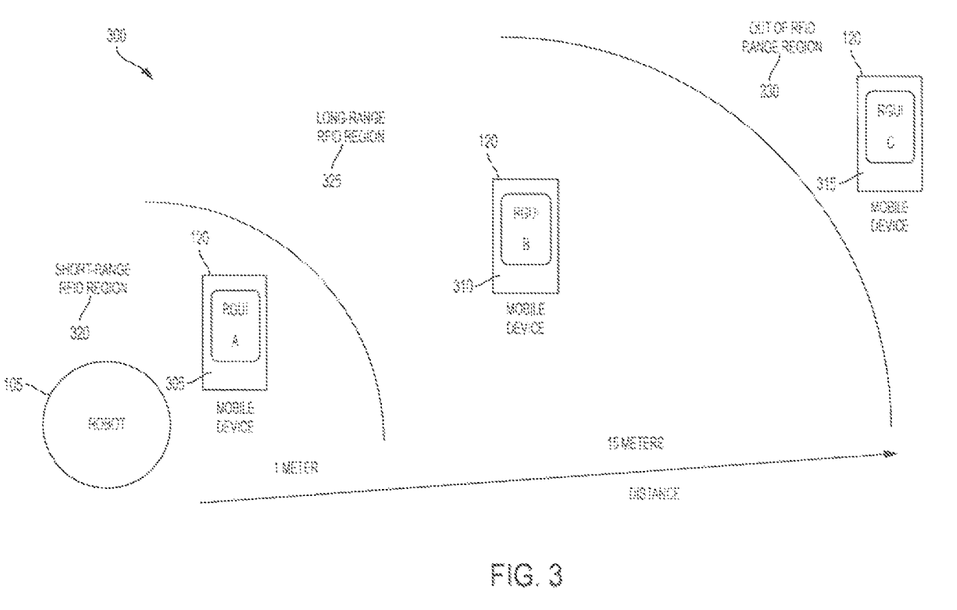
FIG. 3 shows example different usage scenarios for RGUI based on distance from a robot, according to embodiments.

FIG. 3 shows example different usage scenarios 300 for RGUI based on distance from a robot, according to embodiments. As shown in FIG. 3, mobile device 120 can be operable to display a different RGUI depending on a distance from robot 105. For short range distances 320, such as within a RFID region, RGUI A 305 can be displayed on mobile device 120. For mid-range or long range distances 325, RGUI B 310 can be displayed on mobile device 120. For longer range distances or out of RFID range distances 330, RGUI C 315 can be displayed on mobile device 120. The distance can be determined based on one or more technologies and/or protocols, such as WiFi, Bluetooth, RFID, cellular, ANT+, IrDA, ZigBee, Z-Wave, NFC, etc. For example, one or more RFID tags can be positioned on robot 105 and mobile device can be operable to determine a distance from the one or more RFID tags.

Figure 4:
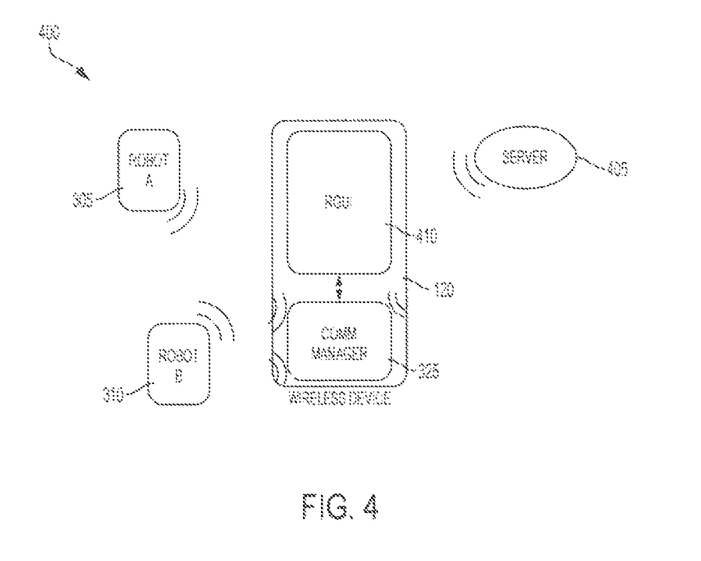
FIG. 4 shows an example system diagram for a mobile device having a RGUI interacting with two robots, according to embodiments.

FIG. 4 shows an example system diagram 400 for a mobile device having a RGUI interacting with two robots, according to embodiments. Mobile device 120 includes, among other feature, RGUI 410 and communication manger 325. Communication manager 325 can wirelessly communicate with robot A 305, robot B 310, and server 405. RGUI 410 can change depending on a distance from of mobile device 120 to robot A and/or robot B or the position of mobile device 120 with respect to robot A 305, robot B 310, and the user.

Figure 5:
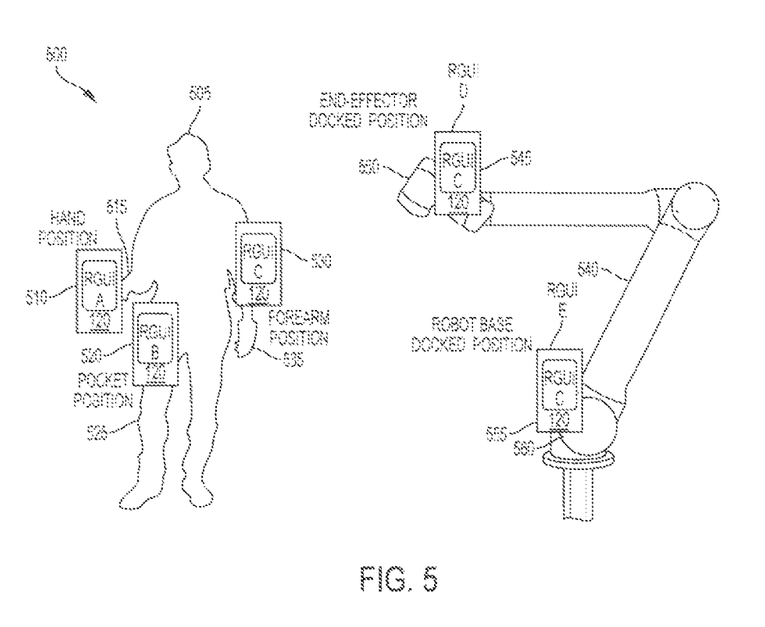
FIG. 5 shows example usage scenario for a mobile device having different RGUIs based on position on a user or a robot, according to embodiments.

FIG. 5 shows example usage scenario 500 for a mobile device having different RGUIs based on position on a user or a robot, according to embodiments. As shown in FIG. 5, the RGUI on mobile device 120 can change depending on position on user 505 and on robot 540. For example, mobile device 120 may be operable to display RGUI A 510 when in hand position 515, RGUI B 520 when in pocket position 525, RGUI C 530 when in forearm position 535, RGUI D 545 when at end effector docked position 550, and RGUI E 555 when at robot base docked position 560.

Figure 6:
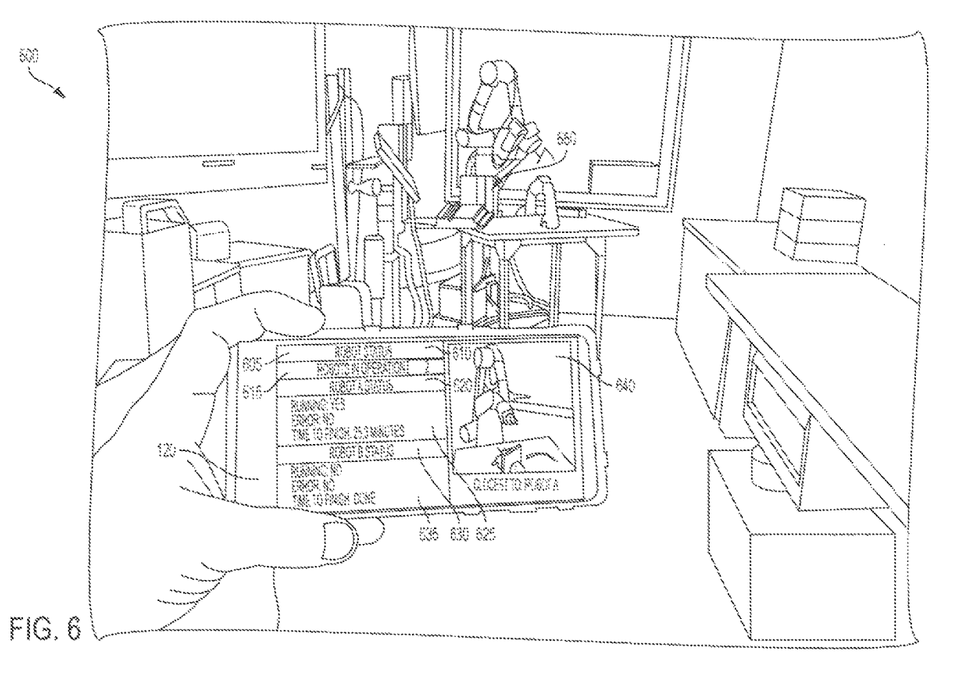
FIG. 6 shows an example usage scenario for a mobile device having a RGUI for two robots, according to embodiments

FIG. 6 shows an example usage scenario 600 for a mobile device having a RGUI for two robots, according to embodiments. When mobile device 120 is in proximity of more than one robot (two are shown in this example), RGUI 605 can display information on each robot. As shown in FIG. 6, RGUI 605 can include fields that show the number of robots in operation 615, robot A status 620 for robot A 650, activity parameters 625 for robot A 650, robot B status 630, activity parameters 635 for robot B, and image 640 of the closest robot, which in this example is robot A 650.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 7:
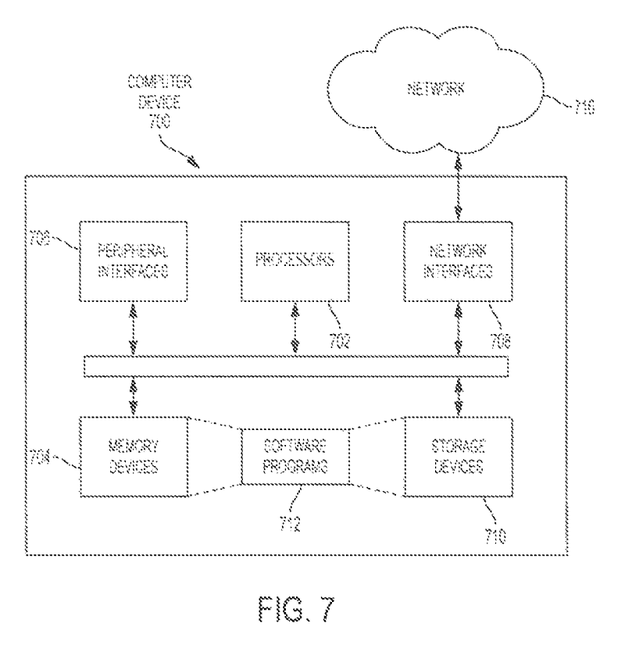
FIG. 7 shows an example computer system according to embodiments.

For example, FIG. 7 illustrates an example of a hardware configuration for a computer device 700 that can be used as mobile device 120, that can be used to perform one or more of the processes described above. While FIG. 7 illustrates various components contained in the computer device 700, FIG. 7 illustrates one example of a computer device and additional components can be added and existing components can be removed.

The computer device 700 can be any type of computer devices, such as desktops, laptops, servers, etc., or mobile devices, such as smart telephones, tablet computers, cellular telephones, personal digital assistants, etc. As illustrated in FIG. 7, the computer device 700 can include one or more processors 702 of varying core configurations and clock frequencies. The computer device 700 can also include one or more memory devices 704 that serve as a main memory during the operation of the computer device 700. For example, during operation, a copy of the software that supports the DNS operations can be stored in the one or more memory devices 704. The computer device 700 can also include one or more peripheral interfaces 706, such as keyboards, mice, touchpads, computer screens, touchscreens, etc., for enabling human interaction with and manipulation of the computer device 700.

The computer device 700 can also include one or more network interfaces 708 for communicating via one or more networks, such as Ethernet adapters, wireless transceivers, or serial network components, for communicating over wired or wireless media using protocols. The computer device 700 can also include one or more storage device 710 of varying physical dimensions and storage capacities, such as flash drives, hard drives, random access memory, etc., for storing data, such as images, files, and program instructions for execution by the one or more processors 702.

Additionally, the computer device 700 can include one or more software programs 712 that enable the functionality described above. The one or more software programs 712 can include instructions that cause the one or more processors 702 to perform the processes described herein. Copies of the one or more software programs 712 can be stored in the one or more memory devices 704 and/or on in the one or more storage devices 710. Likewise, the data, for example, DNS records, utilized by one or more software programs 712 can be stored in the one or more memory devices 704 and/or on in the one or more storage devices 710.

In implementations, the computer device 700 can communicate with other devices via a network 716. The other devices can be any types of devices as described above. The network 716 can be any type of network, such as a local area network, a wide-area network, a virtual private network, the Internet, an intranet, an extranet, a public switched telephone network, an infrared network, a wireless network, and any combination thereof. The network 716 can support communications using any of a variety of commercially-available protocols, such as TCP/IP, UDP, OSI, FTP, UPnP, NFS, CIFS, AppleTalk, and the like. The network 716 can be, for example, a local area network, a wide-area network, a virtual private network, the Internet, an intranet, an extranet, a public switched telephone network, an infrared network, a wireless network, and any combination thereof.

The computer device 700 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 700 as described above need not be enclosed within a single enclosure or even located in close proximity to one another. Those skilled in the art will appreciate that the above-described componentry are examples only, as the computer device 700 can include any type of hardware componentry, including any necessary accompanying firmware or software, for performing the disclosed implementations. The computer device 700 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

While the teachings have been described with reference to examples of the implementations thereof, those skilled in the art will be able to make various modifications to the described implementations without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

The foregoing description of the disclosure, along with its associated embodiments, has been presented for purposes of illustration only. It is not exhaustive and does not limit the disclosure to the precise form disclosed. Those skilled in the art will appreciate from the foregoing description that modifications and variations are possible in light of the above teachings or may be acquired from practicing the disclosure. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

Accordingly, the disclosure is not limited to the above-described embodiments, but instead is defined by the appended claims in light of their full scope of equivalents.

The invention claimed is:

1. A method of controlling a robot graphic user interface ("RGUI") on a mobile device, the method comprising:
   determining a distance, a position, or both of the mobile device with respect to a first robot;
   determining a first communication protocol between the mobile device and the first robot; and
   causing, by a processor, a different RGUI to be displayed on a display of the mobile device based on the determining the distance and the determining the first communication protocol, wherein the different RGUI comprise a first RGUI for a first near operating mode, a second RGUI for an intermediate operating mode, and a third RGUI for a far operating mode,
   wherein the different RGUI changes as one or more of the distance, the position, the first communication protocol of the mobile device changes.

2. The method of claim 1, further comprising:
   determining a distance, a position, or both of the mobile device with respect to a second robot;
   determining a second communication protocol between the mobile device and the second robot; and
   causing, by a processor, the second RGUI to be displayed on the display of the mobile device based on the determining the distance and the determining the second communication protocol.

3. The method of claim 1, wherein the distance, the position, or both is determined based on one or more wireless protocols.

4. The method of claim 3, wherein the one or more wireless protocols comprise one or more of: WiFi, Bluetooth, RFID, cellular, ANT+, IrDA, ZigBee, Z-Wave, NFC.

5. The method of claim 1, wherein the determining comprises:
   assigning the first RGUI, the second RGUI, or the third RGUI for the mobile device based on a waypoint on a user, the first robot, or both; and
   selecting the first RGUI, the second RGUI, or the third RGUI based on the waypoint.

6. A device for controlling a robot graphic user interface ("RGUI"), the device comprising:
   a memory containing instructions; and
   at least one processor, operably connected to the memory, that executes the instructions to perform a method comprising:
   determining a distance, a position, or both of the device with respect to a first robot;
   determining a first communication protocol between the device and the first robot; and
   causing a different RGUI to be displayed on a display of the device based on the determining the distance and the determining the first communication protocol, wherein the different RGUI comprise a first RGUI for a first near operating mode, a second RGUI for an intermediate operating mode, and a third RGUI for a far operating mode, wherein the different RGUI changes as one or more of the distance, the position, the first communication protocol of the device changes.

7. The device of claim 6, wherein the at least one processor is further operable to perform the method comprising:

determining a distance, a position, or both of the device with respect to a second robot;

determining a second communication protocol between the device and the second robot;

causing the second RGUI to be displayed on the display of the device based on the determining the distance and the determining the second communication protocol; and causing a state change on the robot based on the determining the distance and the determining the second communication protocol.

8. The device of claim 6, wherein the distance, the position, or both is determined based on one or more wireless protocols.

9. The device of claim 8, wherein the one or more wireless protocols comprise one or more of: WiFi, Bluetooth, RFID, cellular, ANT+, IrDA, ZigBee, Z-Wave, NFC.

10. The device of claim 6, wherein the determining comprises:

assigning the first RGUI, the second RGUI, or the third RGUI for the device based on a docking location on a user, the robot, or both;

selecting the first RGUI, the second RGUI, or the third RGUI based on the docking location; and causing a state change on the robot based on the docking location.

11. A non-transitory computer-readable storage medium having executable instructions stored thereon which, when executed by at least one electronic processor, cause the at least one electronic processor to perform a method of controlling a robot graphic user interface ("RGUI") on a mobile device, the method comprising:

determining a distance, a position, or both of the mobile device with respect to a first robot;

determining a communication protocol between the mobile device and the first robot; and causing, by a processor, a different RGUI to be displayed on a display of the mobile device based on the determining the distance and the determining the communication protocol, wherein the different RGUI comprise a first RGUI for a first near operating mode, a second RGUI for an intermediate operating mode, and a third RGUI for a far operating mode, wherein the different RGUI changes as one or more of the distance, the position, the first communication protocol of the device changes.

12. The non-transitory computer-readable medium of claim 11, further comprising:

determining a distance, a position, or both of the mobile device with respect to a second robot;

determining a second communication protocol between the mobile device and the second robot;

causing, by a processor, the second RGUI to be displayed on the display of the mobile device based on the determining the distance and the determining the second communication protocol; and causing, by a processor, a state change to occur on the robot.

13. The non-transitory computer-readable medium of claim 11, wherein the distance, the position, or both is determined based on one or more wireless protocols.

14. The non-transitory computer-readable medium of claim 13, wherein the one or more wireless protocols comprise one or more of: WiFi, Bluetooth, RFID, cellular, ANT+, IrDA, ZigBee, Z-Wave, NFC.

15. The non-transitory computer-readable medium of claim 11, wherein the determining comprises:

assigning the first RGUI, the second RGUI, or the third RGUI for the mobile device based on a docking location on a user, the robot, or both;

selecting the first RGUI, the second RGUI, or the third RGUI based on the docking location; and triggering a state change on the robot.

* * * * *